United States Patent
Wolf et al.

(10) Patent No.: US 11,876,470 B2
(45) Date of Patent: Jan. 16, 2024

(54) SYSTEMS AND METHODS FOR ADAPTING PULSE WIDTH MODULATION WITH RANDOMIZED ZERO-SEQUENCE

(71) Applicant: Ford Global Technologies, LLC, Dearborn, MI (US)

(72) Inventors: Chris Wolf, Ann Arbor, MI (US); Michael Degner, Novi, MI (US); Yue Nie, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 234 days.

(21) Appl. No.: 17/169,122

(22) Filed: Feb. 5, 2021

(65) Prior Publication Data

US 2022/0255487 A1 Aug. 11, 2022

(51) Int. Cl.
*H02P 27/08* (2006.01)
*H02P 29/50* (2016.01)
*B60K 6/26* (2007.10)

(52) U.S. Cl.
CPC .............. *H02P 27/085* (2013.01); *B60K 6/26* (2013.01); *B60Y 2200/92* (2013.01); *B60Y 2400/60* (2013.01); *B60Y 2400/61* (2013.01)

(58) Field of Classification Search
CPC ........ H02P 27/08; H02P 27/085; H02P 29/50; B60K 6/26; B60Y 2400/60; B60Y 2400/61
See application file for complete search history.

(56) References Cited

U.S. PATENT DOCUMENTS

| | | | |
|---|---|---|---|
| 6,252,362 B1 * | 6/2001 | White | H02P 6/10 |
| | | | 388/813 |
| 7,576,500 B2 | 8/2009 | Patel et al. | |
| 8,583,265 B1 | 11/2013 | Schulz et al. | |
| 8,649,887 B2 | 2/2014 | Schulz et al. | |
| 8,649,923 B2 | 2/2014 | Sankaran et al. | |
| 8,866,435 B2 * | 10/2014 | Suhama | H02P 21/08 |
| | | | 318/807 |
| 8,907,604 B2 * | 12/2014 | Miller | H02M 7/5395 |
| | | | 327/551 |
| 10,027,262 B2 | 7/2018 | Wolf et al. | |
| 10,259,340 B1 | 4/2019 | Wolf et al. | |
| 10,500,965 B2 | 12/2019 | Wang et al. | |
| 11,190,125 B2 * | 11/2021 | Kajino | B60K 6/442 |

FOREIGN PATENT DOCUMENTS

CN 105099315 B 6/2017

* cited by examiner

*Primary Examiner* — Thai T Dinh
(74) *Attorney, Agent, or Firm* — Kelley David; McCoy Russell LLP

(57) ABSTRACT

Methods and systems are provided for adapting pulse width modulation with randomized zero-sequence components for control of an electrified powertrain of a vehicle. In one example, a method may include determining a zero-sequence voltage of an electric machine of the vehicle based on a random distribution, and adjusting a voltage reference signal of the electric machine based on the determined zero-sequence voltage to decrease ambient acoustic noise in the vehicle. In this way, spectral energy dispersion of pulse width modulated control of the electric machine may be increased without affecting torque production of the electric machine.

20 Claims, 8 Drawing Sheets

SYSTEMS AND METHODS FOR ADAPTING PULSE WIDTH MODULATION WITH RANDOMIZED ZERO-SEQUENCE

FIELD

The present description relates generally to methods and systems for adapting pulse width modulation with randomized zero-sequence components to reduce noise in a vehicle cabin.

BACKGROUND/SUMMARY

A vehicle, such as a hybrid electric vehicle or an all-electric vehicle, may include an electrified powertrain capable of supplying sufficient power to propel the vehicle independent of an internal combustion engine. Such an electrified powertrain may include an electric motor and a power source, such as a rechargeable battery or battery pack, configured to power the electric motor. The electric motor, powered by the power source, provides torque to one or more drive wheels of the vehicle via a driveshaft, thereby propelling the vehicle. A power circuit for the electrified powertrain may include an inverter for providing alternating current from the power supply, where the power circuit controls adjusting switches of the inverter to open and close in various combinations to provide desired voltages to the electric motor. In particular, the power circuit may use pulse width modulation (PWM) techniques to turn the switches on and off, where the rate or frequency at which the switches are turned on and off generally depends on motor speed or torque demand. Controlling the switches at certain switching frequencies may generate noise that is audible to the occupants of the vehicle.

Previous attempts to address such PWM acoustic emissions include using higher switching frequencies, which may be less audible to vehicle occupants, during vehicle operating conditions wherein PWM noise may be more pronounced. One example approach is shown by Sankaran et al. in U.S. Pat. No. 8,649,923. Therein, the inverter is controlled with either a default mode or a noise-reduction mode, wherein the default mode uses lower switching frequencies within the human audible range and the noise-reduction mode uses higher switching frequencies outside the human audible range. Another example approach is shown by Wolf et al. in U.S. Pat. No. 10,259,340. Therein, discrete switching frequencies for controlling the inverter are selected according to rotor-torque-based probability weights such that the probability that the inverter operates at the discrete switching frequencies changes as rotor torque changes.

However, the inventors herein have recognized potential issues with such systems. As one example, the use of the default mode depends on the presence of alternative noise sources that may mask the audible PWM acoustic emissions, while the higher switching frequencies of the noise-reduction mode induce power losses in the system that can reduce fuel economy of a hybrid vehicle and increase power circuit costs. Further, the calibration of such an approach is difficult as the masking nature of vehicle noise is inherently varying due to different driver behaviors, road surfaces, and ambient noise conditions, which may not be fully accounted for through design alone. Further still, the probabilistic approach to selecting PWM switching frequencies leaves little room for additional NVH reduction through PWM adaptation without negatively impacting torque production.

In one example, the issues described above may be addressed by a method for controlling an electrified powertrain of a vehicle, the method including determining a zero-sequence voltage of an electric machine of the vehicle based on a random distribution, the random distribution scaled based on a potential range of the zero-sequence voltage, and adjusting a voltage reference signal of the electric machine based on the determined zero-sequence voltage to decrease ambient acoustic noise in the vehicle. In this way, acoustic emissions resulting from PWM control of the electric machine may be decreased, regardless of a method for selecting PWM switching frequencies and without affecting torque production of the electric machine.

As one example, randomizing the zero-sequence voltage, also referred to as the common-mode voltage, results in random adjustments in the positions of PWM pulses within switching periods without otherwise changing the PWM control signals (e.g., without changing the pulse width, switching frequencies, amplitudes, and so on). Randomizing the zero-sequence voltage thus enables increased spectral energy dispersion and corresponding reductions in PWM acoustic emissions when combined with existing PWM schemes such as dithered and random PWM. Further, as the zero-sequence voltage of a three-phase wye-connected electric machine does not cause current to flow in the windings of the electric machine, torque production is not changed when the zero-sequence is randomized as described further herein. In this way, the acoustic emissions of any PWM scheme may be reduced across all operating points without affecting efficiency of an electrified drivetrain.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
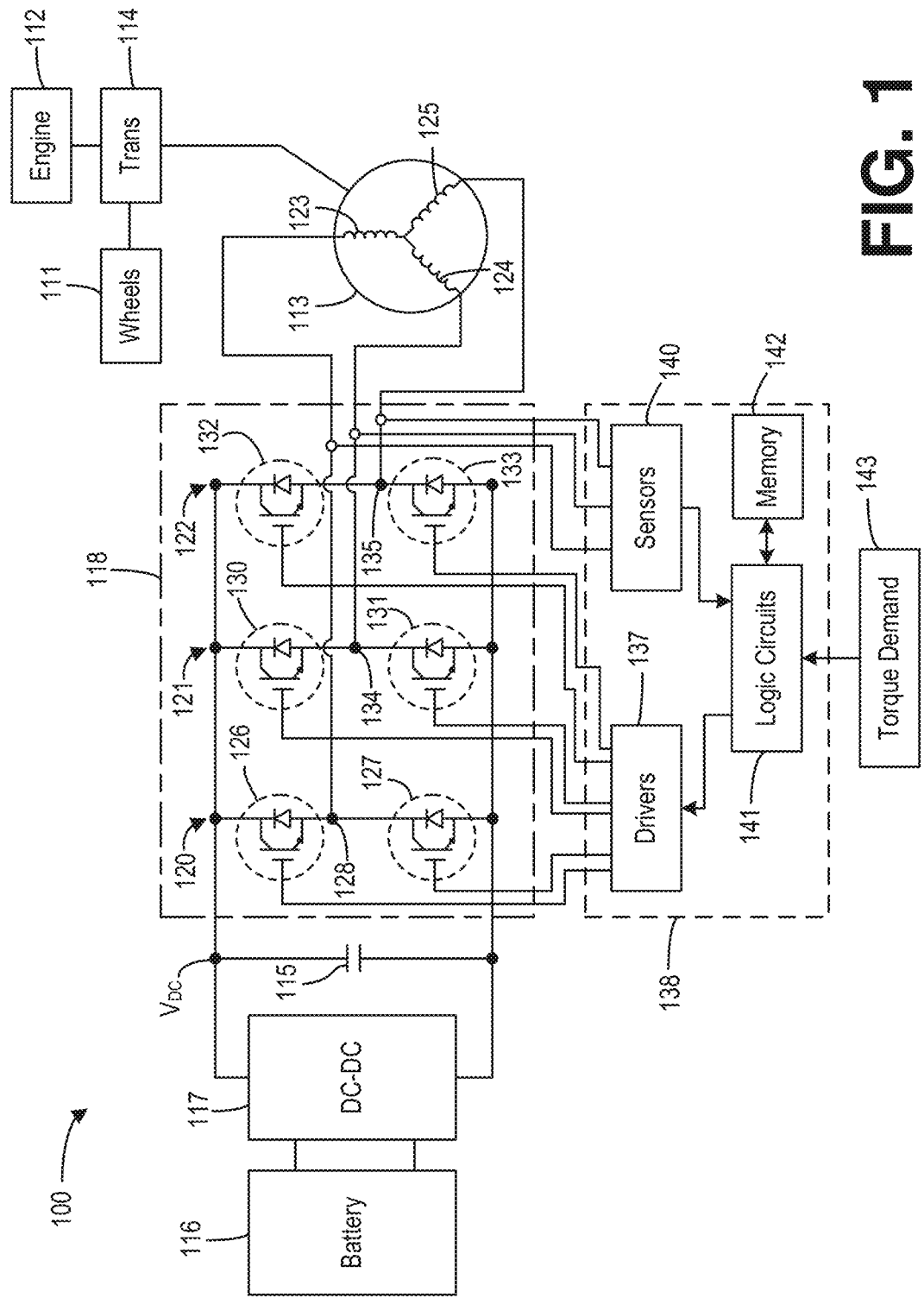
FIG. 1 shows a schematic diagram illustrating an example electrified powertrain of a vehicle system.
Figure 2:
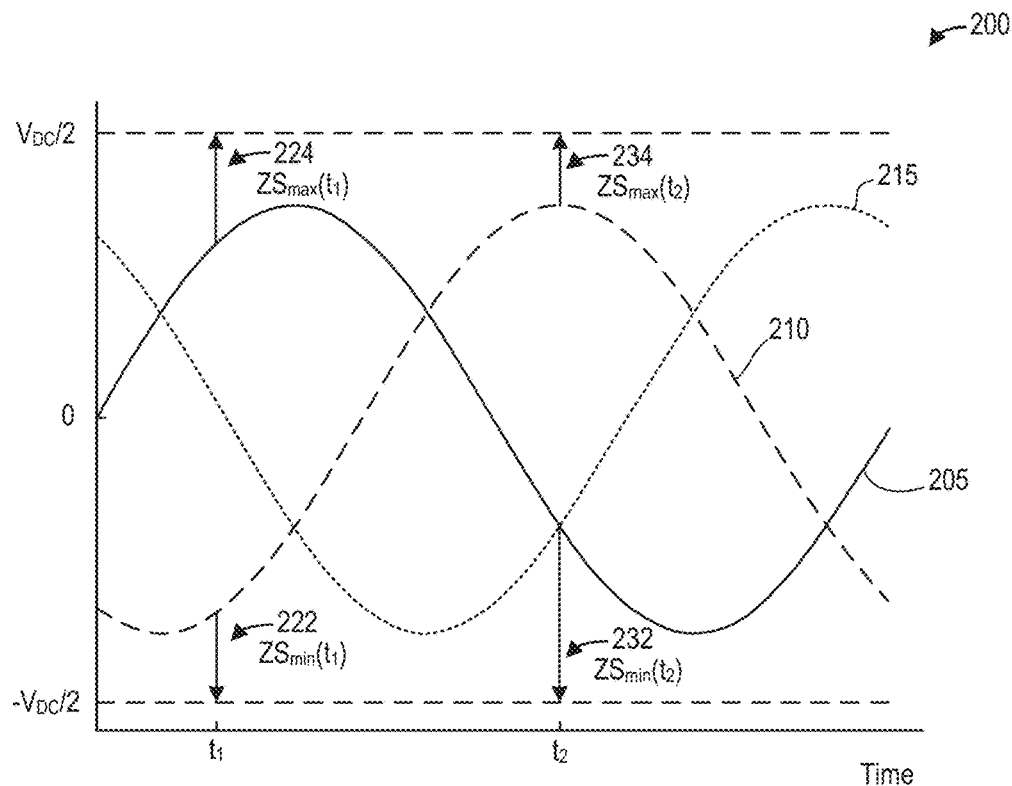
FIG. 2 shows a graph illustrating example phase voltage commands for an electric machine of an electrified powertrain.
Figure 3:
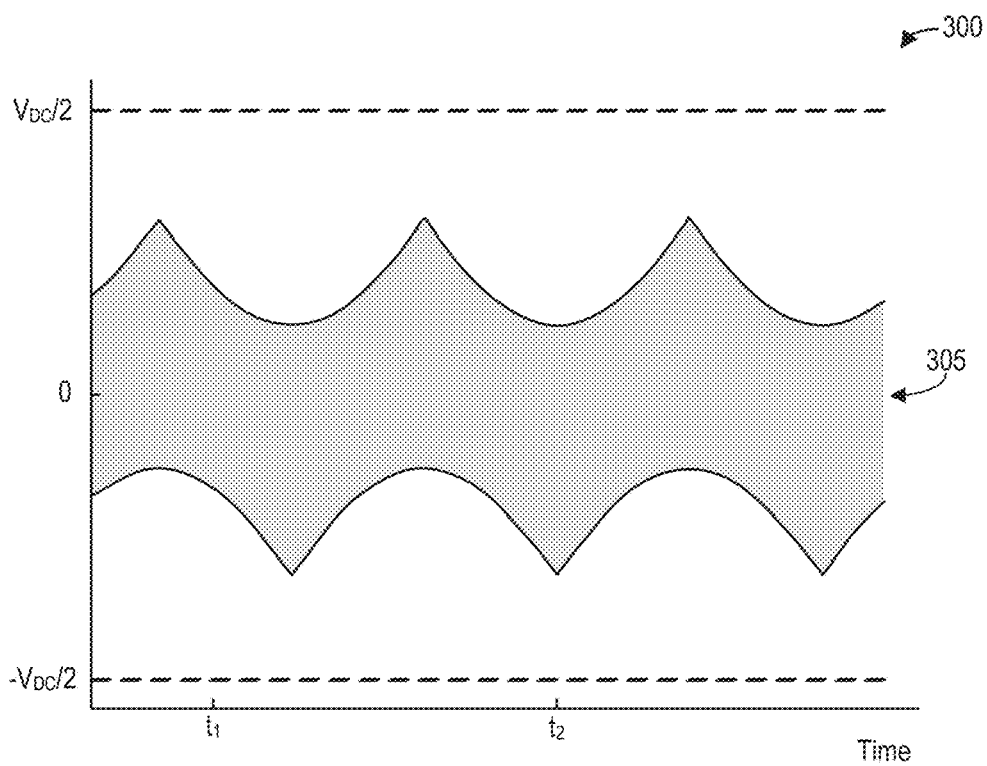
FIG. 3 shows a graph illustrating an example range of potential zero-sequence voltages for the example phase voltage commands of FIG. 2.
Figure 4:
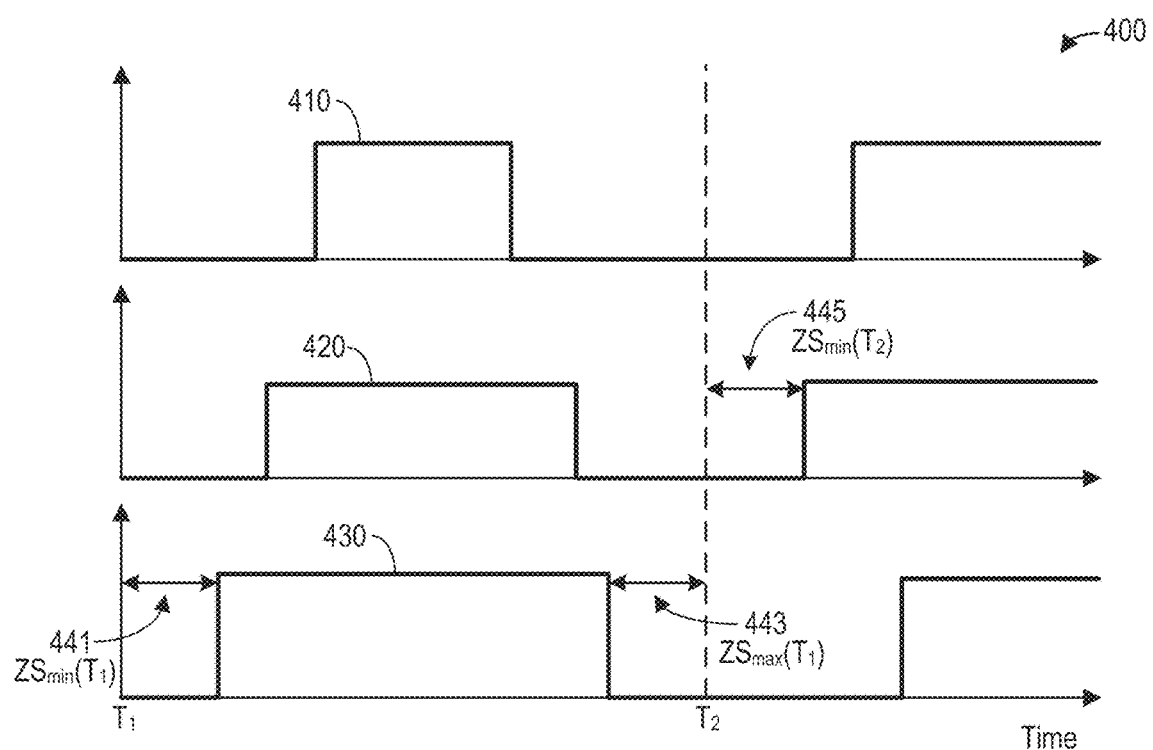
FIG. 4 shows a graph illustrating example PWM commands and zero-sequence voltage boundaries for symmetric PWM.
Figure 5:
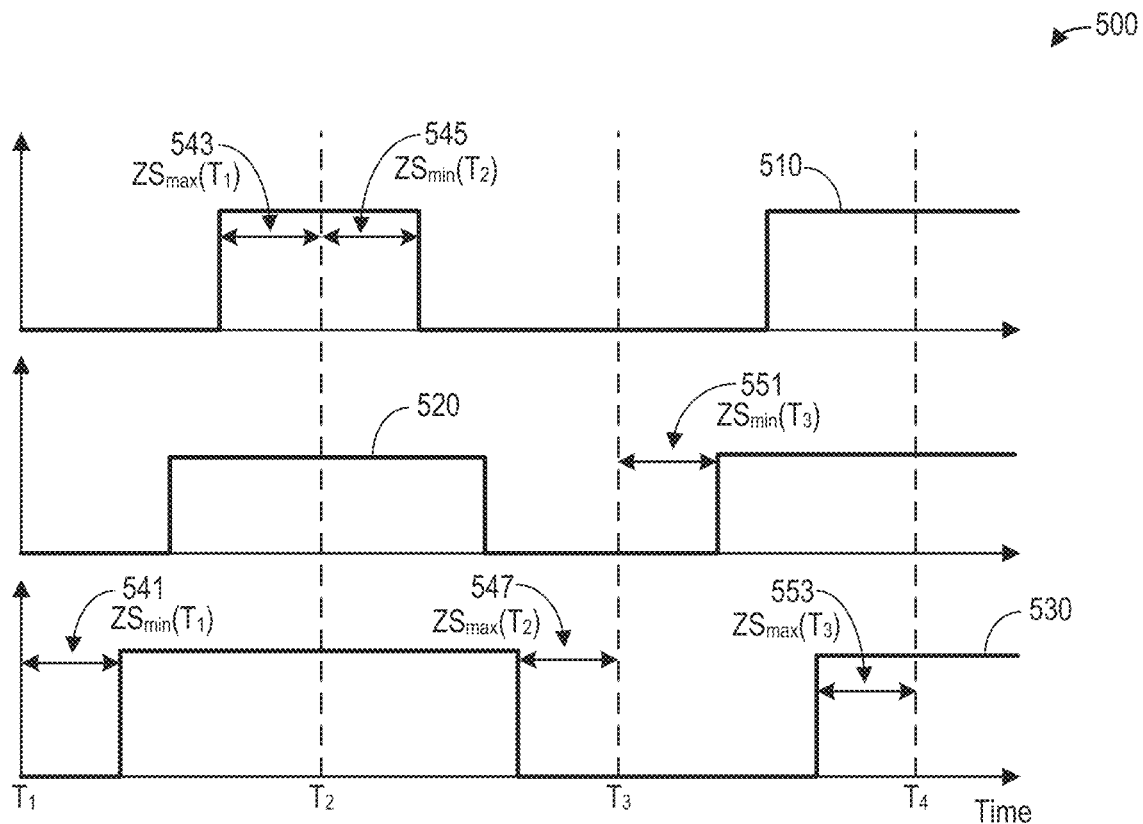
FIG. 5 shows a graph illustrating example PWM commands and zero-sequence voltage boundaries for asymmetric PWM.
Figure 7:
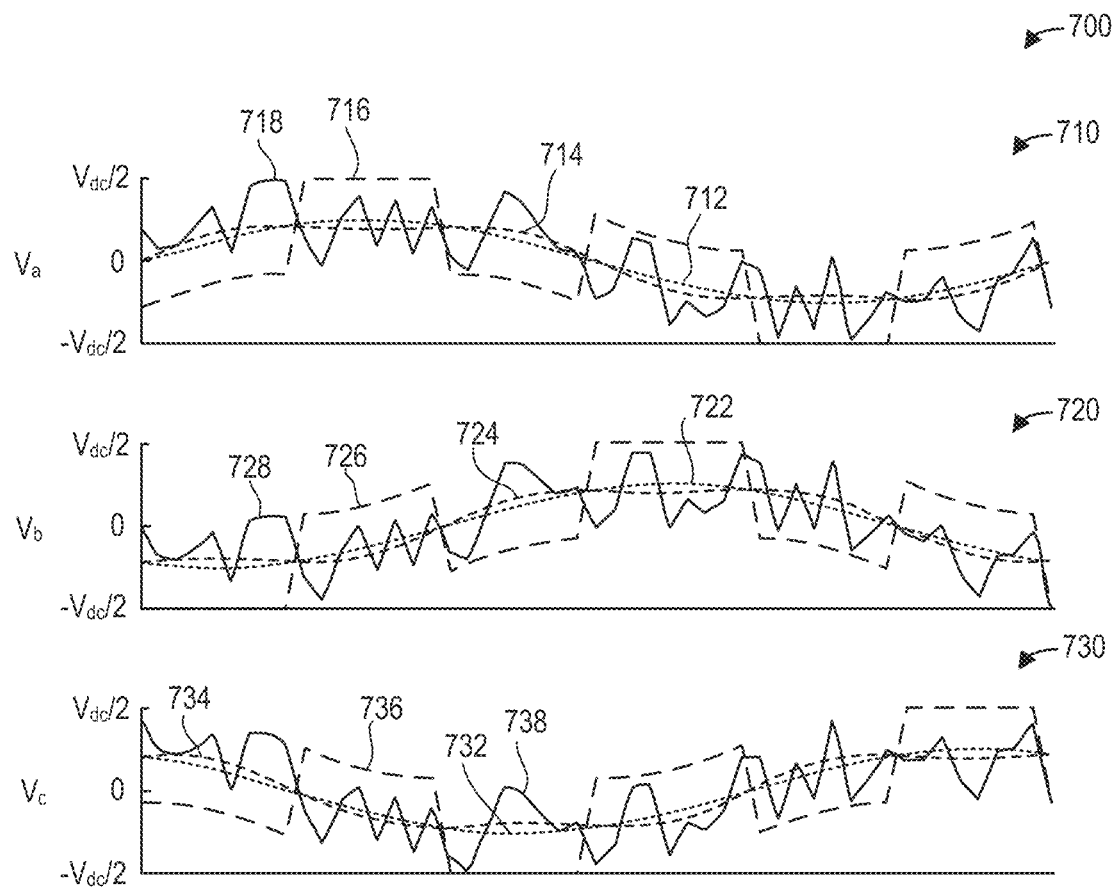
FIG. 7 shows a set of graphs illustrating example phase voltage commands for different zero-sequence schemes.
Figure 8:
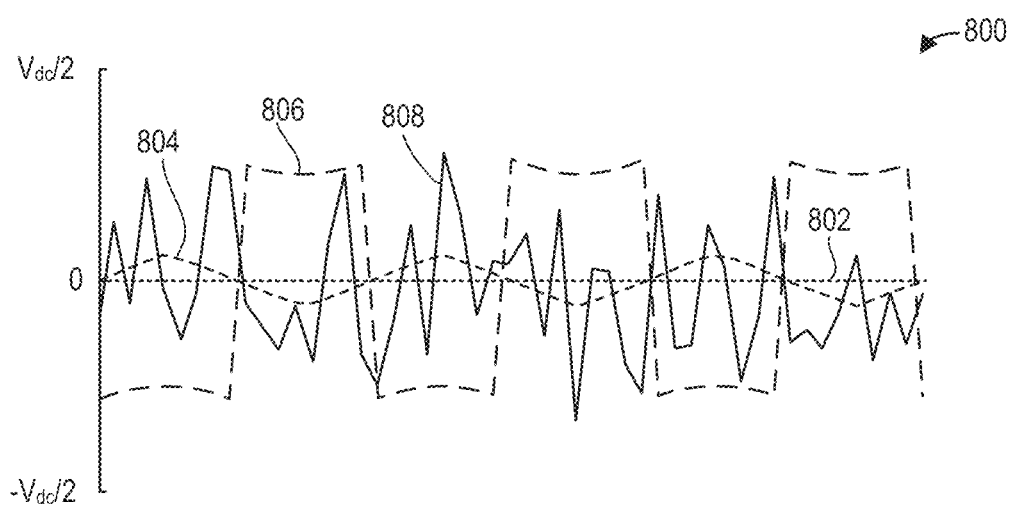
FIG. 8 shows a graph illustrating example zero-sequence voltages for the example phase voltage commands of FIG. 7.
Figure 9:
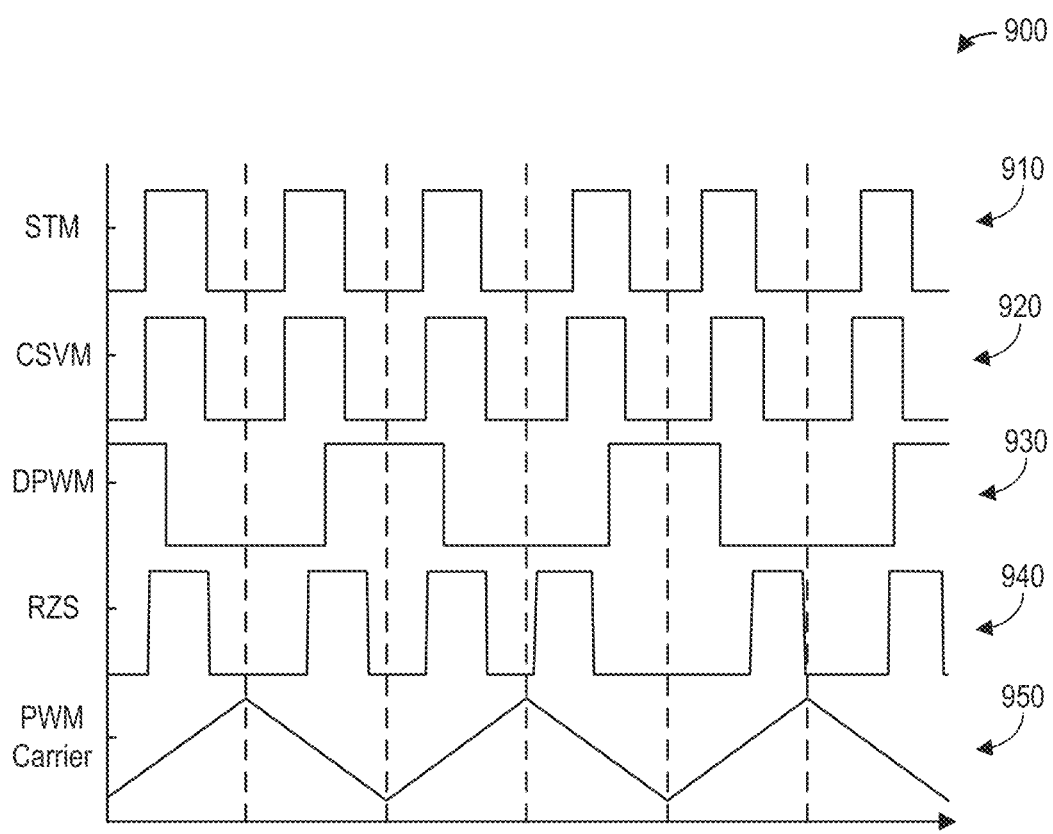
FIG. 9 shows a graph illustrating example PWM duty-cycle commands for different zero-sequence schemes.
Figure 10:
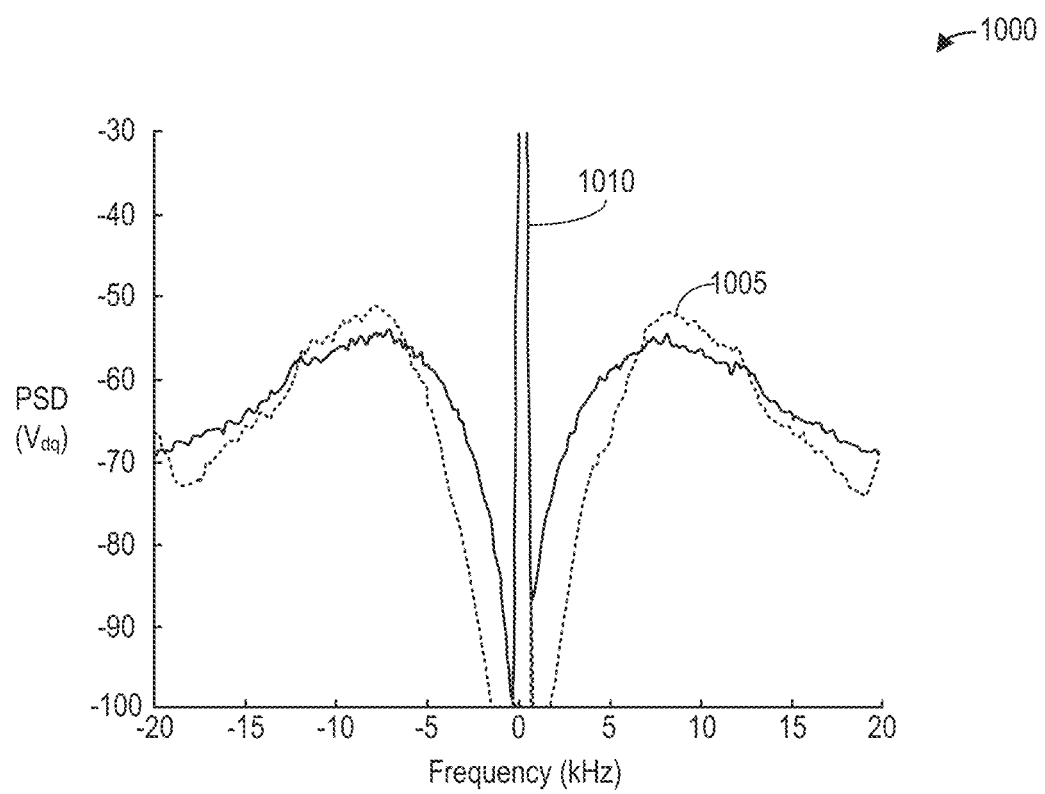
FIG. 10 shows a graph illustrating example power spectral densities during adaptation of PWM with zero-sequence randomization and space vector modulation.

The following description relates to systems and methods for mitigating noise, vibrations, and harshness (NVH) resulting from pulse width modulation (PWM) control of a vehicle electric drive system, such as the electrified powertrain included in the vehicle system of FIG. 1. Pulse width modulation (PWM) is typically used to transfer power from a battery to an electric machine of an electrified vehicle powertrain, wherein different PWM schemes may be implemented to control the opening and closing of electronic switches and thus regulate the transfer of power from the battery to the electric machine via the switches. Since the switching of the various switches on and off may generate audible noise at certain switching frequencies, the switching frequencies are selected to reduce sound emissions while addressing the needs for motor speed, torque requirements, and fuel efficiency. Further, as the common-mode voltage, also referred to as the zero-sequence voltage, of a three-phase wye-connected electric machine does not cause current to flow in the windings of the electric machine, thereby not resulting in torque production of the electric machine, the zero-sequence voltage may be adjusted to modify the reference voltage waveforms for the electric machine without affecting torque production. The potential range of the zero-sequence voltage is limited by the reference voltage waveforms and the voltage limitations of the inverter at a given sampling instant, as depicted in FIGS. 2 and 3. With regard to the PWM control signals themselves, such limitations ensure that the PWM pulses maintain their pulse width within a PWM switching period despite the addition of zero sequence, as depicted in FIGS. 4 and 5. A method for PWM control of an electric machine, such as the method shown in FIG. 6, therefore includes randomly selecting a zero-sequence voltage within a potential range of zero-sequence voltages for each sampling period of PWM control. The randomization of zero-sequence voltage over time thus changes the phase voltage waveforms relative to other non-random approaches to modifying zero-sequence voltage, as depicted in FIGS. 7 and 8. The change in zero-sequence voltage results in corresponding changes in PWM control signals, as shown in FIG. 9. Randomizing the pulse shifts in this way results in increase spectral dispersion of PWM-related content relative to other non-random zero-sequence modifications, especially in combination with randomized switching frequency, as shown in FIG. 10. These improvements in PWM acoustic emissions may be achieved through randomized zero-sequence voltages with minimal calibration and without cost in torque production.

Turning to the figures, FIG. 1 shows a hybrid electric vehicle 100 as one type of vehicle for implementing PWM as described herein. Vehicle wheels 111 may be driven by an internal combustion engine 112 and/or by a traction motor 113 via a transmission 114. For providing electric propulsion, motor 113 may be driven via an inverter switching bridge 118 that receives a DC link voltage $V_{DC}$ at a DC link capacitor 115. The DC link voltage $V_{DC}$ may result from conversion of DC power from a battery pack 116 by a converter 117. A controller 138 may control the inverter switching bridge, herein also referred to as an inverter, 118, to transfer power from the battery pack or battery 116 to the electric machine or motor 113, which may comprise a three-phase wye-connected electric machine as depicted.

In some examples, vehicle 100 may be a hybrid vehicle with multiple sources of torque available to one or more vehicle wheels 111. In other examples, vehicle 100 is an electric vehicle with only an electric machine(s). In the example shown, vehicle 100 includes engine 112 and an electric machine or motor 113. Electric machine 113 may be a motor or a motor/generator. A crankshaft of the engine 112 and electric machine 113 are connected via transmission 114 to vehicle wheels 111 when one or more clutch (not shown) is engaged. As an illustrative example, a first clutch may be provided between the crankshaft of the engine 112 and electric machine or motor 113, and a second clutch may be provided between the electric machine 113 and transmission 114. Controller 138 may send a signal to an actuator of each clutch to engage or disengage the clutch, so as to connect or disconnect the engine crankshaft from electric machine 113 and the components connected thereto, and/or connect or disconnect electric machine 113 from transmission 114 and the components connected thereto. Transmission 114 may be a gearbox, a planetary gear system, or another type of transmission.

The powertrain may be configured in various manners, including as a parallel, a series, or a series-parallel hybrid vehicle. In electric vehicle embodiments, a system battery 116 may be a traction battery that delivers electric power to electric machine 113 to provide torque to vehicle wheels 111. In some embodiments, electric machine 113 may also be operated as a generator to provide electrical power to charge system battery 116, for example, during a braking operation. It will be appreciated that in other embodiments, including non-electric vehicle embodiments, system battery 116 may be a typical starting, lighting, ignition (SLI) battery coupled to an alternator (not shown).

The inverter 118 includes phase legs 120, 121, and 122 coupled to motor phase windings 123, 124, and 125 of the motor 113. Phase leg 120 includes an upper switching device 126 and a lower switching device 127 connected in series across DC link 115 and providing a junction 128 between devices 126 and 127 which is connected to winding 123 of the motor 113. Similarly, phase leg 121 includes an upper switching device 130 and a lower switching device 131, while phase leg 122 includes an upper switching device 132 and a lower switching device 133. Junctions 134 and 135 are coupled respectively to the motor windings 124 and 125.

The switching devices may comprise insulated-gate bipolar transistors (IGBTs), antiparallel diodes, wide band gap field-effect transistors (FETs), or other devices. Each of the upper and lower switching devices includes a respective gate terminal coupled to drivers 137 in a controller 138. Current sensors 140 coupled to each of the junctions of the phase legs measure the current flow through each phase winding. Measured current magnitudes are provided from sensors 140 to logic circuits 141 in controller 138 for use in determining PWM switching signals to be applied to the switching devices by drivers 137. The measured current may be compared with a desired motor current as determined according to a torque demand 143 that may be derived from operator input such as an accelerator pedal so that the operator can control the vehicle speed. Thus, current feedback determines a PWM duty cycle within logic circuits 141 that is then used to generate the timing of PWM switching signals for the phase leg switching devices.

Controller 138 is shown in FIG. 1 as a microcomputer which may comprise a microprocessor unit, input/output ports, an electronic storage medium or memory 142 for executable programs (e.g., executable instructions) and calibration values, wherein the memory 142 may comprise one or more volatile and/or non-volatile memory elements, including one or more of a non-transitory read-only memory chip, random access memory, keep alive memory, and a data bus. The logic circuits 141 of the controller 138 may thus comprise a processor. In some examples, the memory 142 may be integrated into the logic circuits 141. Controller 138 may receive various signals from sensors 140 coupled to the motor 113 as well as the engine 112, including signals previously discussed and additionally including, for example, a measurement of inducted mass air flow (MAF) from a mass air flow sensor; an engine coolant temperature (ECT) from a temperature sensor coupled to a cooling sleeve; an exhaust gas temperature from a temperature sensor coupled to exhaust passage; a profile ignition pickup signal (PIP) from a Hall effect sensor (or other type) coupled to the crankshaft of the engine 112; a throttle position signal (TP) from a throttle position sensor; signal UEGO from an exhaust gas sensor, which may be used by controller 138 to determine the AFR of the exhaust gas; a knock signal from knock sensor; and an absolute manifold pressure signal (MAP) from a MAP sensor. An engine speed signal, RPM, may be generated by controller 138 from the PIP signal. The manifold pressure signal MAP from MAP sensor may be used to provide an indication of vacuum or pressure in the intake manifold. Controller 138 may infer an engine temperature based on the engine coolant temperature.

Controller 138 receives signals from the various sensors 140, processes the received signals, and employs the various actuators of FIG. 1 (e.g., relating to the engine 112, the transmission 114, the switching devices of the inverter 118, and so on) to adjust vehicle operation based on the received signals and instructions stored on a memory 142 of the controller 138. For example, the controller 138 may receive a pedal position signal from a pedal position sensor (not shown), process the pedal position signal to determine a torque demand 143, and control the electric machine 113 to provide torque to vehicle wheels 111 according to the torque demand. To control the electric machine 113 as desired, the controller 138 may control one or more electronic switches or switching devices of the inverter 118 to turn on and/or off in order to selectively regulate the delivery of power from the battery 116, for example, to the electric machine 113.

A program executed by the logic circuits 141 may be stored as executable instructions in the memory 142 of the logic circuits 141, for example. The program may include one or more additional or separate programs, each of which includes an ordered list of executable instructions for implementing logical functions associated with the controller 138. The logical function may include controlling the inverter 118 according to a table stored within the memory of the logic circuits 141, for example.

In particular, pulse width modulation (PWM) techniques are used to control the switches, and the logic circuits 141 may command the upper and lower switching devices of the inverter 118 to open and close as desired. The switching frequency for each switching device of the inverter 118 or the rate at which each switching device is turned on and off, is typically determined by motor speed or torque requirements as well as fuel efficiency considerations. Since the switching of the various switches on and off may generate audible noise at certain switching frequencies, the switching frequencies are selected to reduce sound emissions while addressing the needs for motor speed, torque requirements, and fuel efficiency. The particular PWM scheme or PWM operating mode used to control the inverter 118 may depend on various operating conditions of the vehicle. As illustrative and non-limiting examples, the PWM scheme or mode may include one or more PWM implementation strategies such as continuous PWM, discontinuous PWM, random PWM, fixed frequency PWM, and so on. Further, different PWM modes may comprise a noise-reduction mode configured for performing PWM with reduced noise as well as a fuel-efficiency mode configured for maximizing fuel efficiency. As an example, for a noise-reduction mode, high switching frequencies may be used with random PWM or another PWM strategy during periods of increasing or decreasing vehicle speed wherein switching noise may be more pronounced, as the high frequencies may be inaudible to humans. In contrast, for a fuel-efficiency mode, low switching frequencies may be used with a PWM strategy to reduce power losses that may in turn impact fuel efficiency, for example, despite the potential audibility of such low switching frequencies. Further, dithering may be used in conjunction with any PWM mode for controlling the switches. In general, during vehicle operation, the controller 138 selects a PWM scheme for controlling the inverter 118 and thus driving the motor 113 based on operating conditions of the vehicle, such as vehicle speed, torque demand, and so on, wherein the PWM scheme comprises a PWM implementation strategy (e.g., random PWM, continuous PWM, and so on), a PWM mode (e.g., noise-reduction mode, fuel-efficiency mode, and so on), and other factors (e.g., dithering).

Furthermore, even in noise-reduction modes wherein switching frequencies are selected to reduce emissions of sound, the various considerations in a PWM scheme may result in PWM acoustic emissions that are audible within the vehicle cabin. A controller, such as the controller 138, may execute a PWM adaptation method that runs continuously with PWM to randomly adjust the zero-sequence voltage of an electric machine, such as the electric machine or motor 113. The zero-sequence voltage of a three-phase wye-connected electric machine, such as the motor 113, does not cause current to flow in the windings of the electric machine, and therefore has no impact on torque production. Randomizing the zero-sequence component of the voltage reference signal of the electric machine results in a randomization of pulse shifts for PWM control signals. The randomization of the zero-sequence voltage thus provides additional spectral dispersion beyond spectral dispersion achieved by PWM implementation strategies such as random PWM, wherein the PWM switching frequency is randomized.

FIG. 2 shows a graph 200 illustrating example phase voltage commands for an electric machine, such as the electric machine or motor 113, of an electrified powertrain. In particular, the graph 200 depicts a first phase voltage command 205, a second phase voltage command 210, and a third phase voltage command 215 for phases A, B, and C of a three-phase wye-connected electric machine. As depicted, the phase voltage commands 205, 210, and 215 are constrained by the DC voltage $V_{DC}$.

The zero-sequence voltage has a potential range that is determined by the individual phase voltage commands 205, 210, and 215 as well as the DC voltage $V_{DC}$. In particular, the potential zero-sequence voltage is constrained such that when added to the individual phase voltage commands, the zero-sequence voltage combined with the phase voltage commands do not exceed the limitations of the DC voltage $V_{DC}$. Thus, at the time $t_1$, the minimum zero-sequence voltage 222 and the maximum zero-sequence voltage 224 indicate the minimum and maximum zero-sequence voltages that may be added to the phase voltage commands at the time $t_1$ without exceeding the DC voltage $V_{DC}$. Similarly, at the time $t_2$, the minimum zero-sequence voltage 232 and the maximum zero-sequence voltage 234 indicate the minimum and maximum zero-sequence voltages that may be added to the phase voltage commands at the time $t_2$ without exceeding the DC voltage $V_{DC}$. The maximum and minimum zero-sequence voltages comprise boundaries on the potential range of zero-sequence voltages. As an illustrative example, FIG. 3 shows a graph illustrating an example range 305 of potential zero-sequence voltages over time for the example phase voltage commands of FIG. 2. As described further herein, zero-sequence voltages may be randomly selected from within the range 305 of potential zero-sequence voltages. By randomly selecting zero-sequence voltages within a range of potential zero-sequence voltages for given phase voltage commands, the spectral energy dispersion may be increased (e.g., PWM acoustic emissions are decreased) without impacting the torque production of the electric machine.

To further illustrate the boundaries of the potential zero-sequence voltages, FIG. 4 shows a graph 400 illustrating example PWM commands and zero-sequence boundaries for symmetric PWM. For symmetric PWM, the duty cycle and the switching pattern are determined once per switching cycle, wherein the duration of each switching cycle and thus the sample period is $(T_2-T_1)$, as an illustrative example. As depicted, the center of the pulses of the first PWM command 410, the second PWM command 420, and the third PWM command 430 are temporally aligned within each switching cycle. The boundaries of the potential zero sequences for each sample period correspond to the amount of added zero sequence that would not push a switching instant into a neighboring sample period. Thus, for the sample period beginning at time $T_1$, the minimum zero sequence 441 and the maximum zero sequence 443 (e.g., $ZS_{min}(T_1)$ and $ZS_{max}(T_1)$ respectively) measured relative to the widest pulse within the period (e.g., the pulse of the third PWM command 430 as depicted) comprise an amount of zero sequence that could be added to the beginning and the end, respectively, of the PWM commands 410, 420, and 430 within the sample period without pushing the pulses into a neighboring sample period. Similarly, the minimum zero sequence 445 comprises the largest zero sequence that could be added to the beginning of the PWM commands 410, 420, and 430 within the sample period beginning at time $T_2$ without pushing the pulses within the sample period beginning at time $T_2$ into the neighboring sample period (e.g., without extending the pulses of the PWM commands 410, 420, and 430 from after $T_2$ to before $T_2$).

As another example, FIG. 5 shows a graph 500 illustrating example PWM commands and zero-sequence voltage boundaries for asymmetric PWM, wherein the PWM duty cycle and switching pattern are updated twice per switching cycle. For asymmetric PWM, the zero sequence may be chosen twice per switching cycle, and so there are two sample periods per switching cycle. For example, as depicted, a switching cycle extends from time $T_1$ to time $T_3$, with a first sample period extending from time $T_1$ to time $T_2$ and a second sample period extending from time $T_2$ to time $T_3$. Similarly, the second switching cycle depicted extends from the time $T_3$ to a time $T_5$ (not depicted), with a third sample period extending from time $T_3$ to time $T_4$, and a fourth sample period extending from time $T_4$ to the time $T_5$. As depicted, the center of the pulses of the first PWM command 510, the second PWM command 520, and the third PWM command 530 are temporally aligned and centered within each switching cycle, and the sampling periods temporally coincide with the center of the pulses (e.g., with the second and fourth sample periods beginning at the times $T_2$ and $T_4$).

For asymmetric PWM, as depicted, the lower bound or minimum zero sequence 541 is the largest zero sequence that may be added to the beginning of the PWM commands 510, 520, and 530 within the first sample period ranging from times $T_1$ to $T_2$ without pushing the switching instant (e.g., the vertical change in the pulses) into a neighboring sample period (e.g., to the sample period prior to time $T_1$), while the upper bound or maximum zero sequence 543 is the largest zero sequence that may be added to the end of the PWM commands 510, 520, and 530 within the first sample period without pushing the switching instant into the neighboring sample period (e.g., to the second sample period after time $T_2$). The minimum zero sequence 545 and the maximum zero sequence 547 similarly indicate the lower and upper bounds for the potential zero sequence within the second sampling period between times $T_2$ and $T_3$, while the minimum zero sequence 551 and the maximum zero sequence 553 indicate the lower and upper bounds for the potential zero sequence within the third sampling period between times $T_3$ and $T_4$, as depicted.

Figure 6:
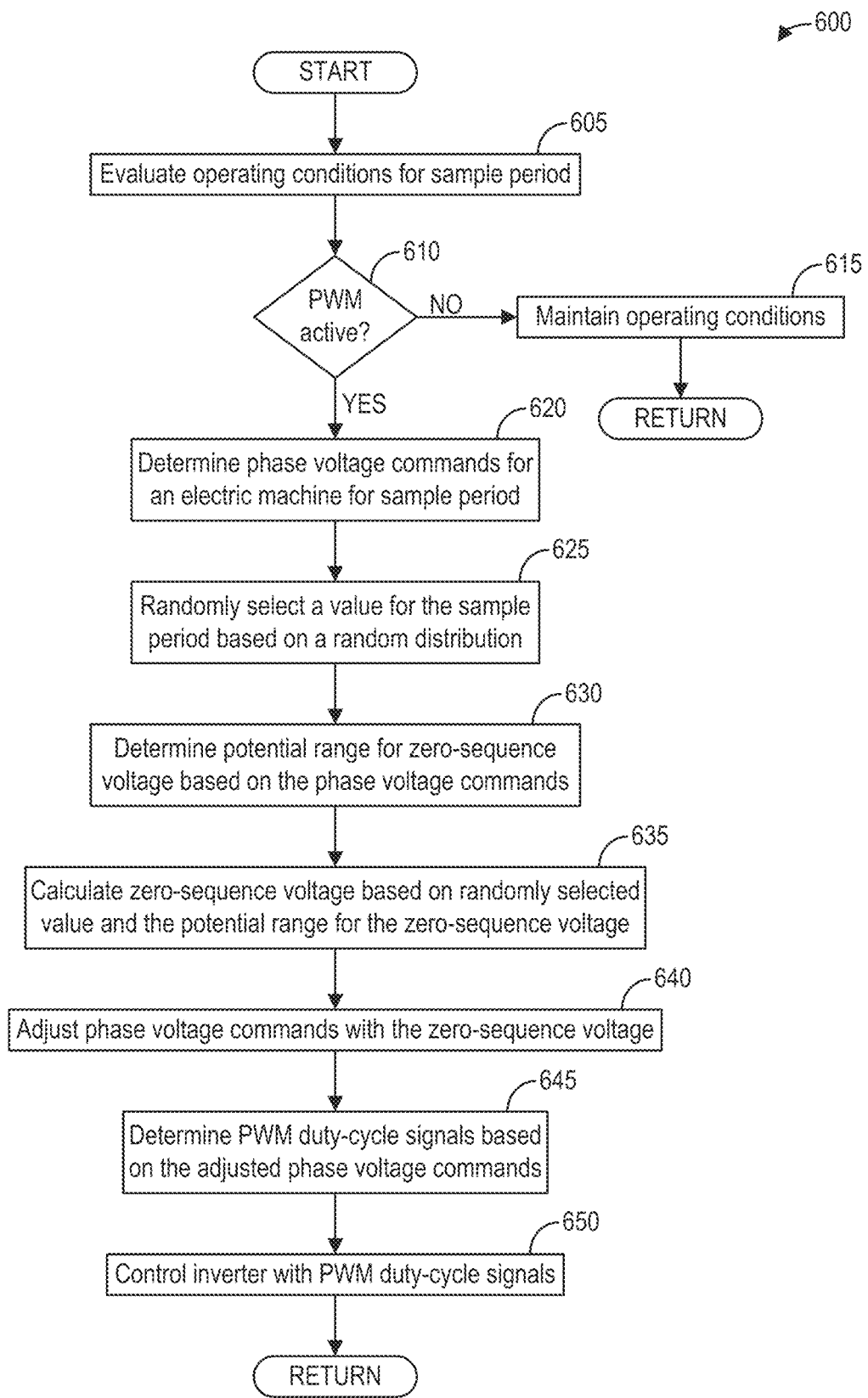
FIG. 6 shows a high-level flow chart illustrating an example method for PWM control with zero-sequence randomization.

FIG. 6 shows a high-level flow chart illustrating an example method 600 for PWM control with zero-sequence randomization to increase spectral energy dispersion according to an embodiment. Instructions for carrying out method 600 and the rest of the methods included herein may be executed by a controller based on instructions stored on a memory of the controller and in conjunction with signals received from sensors of the vehicle system, such as the sensors described above with reference to FIG. 1. For example, method 600 may be implemented as executable instructions in non-transitory memory 142 of the controller 138 that when executed by the logic circuits 141 cause the controller 138 to perform the actions described herein.

Method 600 begins at 605. At 605, method 600 evaluates operating conditions for the sample period. The operating conditions may include, as illustrative and non-limiting examples, one or more of a motor current signal from a current sensor, such as the sensors 140, that measures current flowing in the electric machine 113 as a measure of torque, a motor position signal from a rotation sensor monitoring rotation as a measure of speed, an input voltage such as the DC link voltage being applied to the inverter bridge, a torque or speed demand, and whether PWM is active. Operating conditions such as torque or speed demand may be evaluated based on pedal position, for example. If PWM is active, the operating conditions may further include one or more parameters relating to the PWM scheme.

At 610, method 600 determines whether PWM is active. If PWM is not active ("NO"), method 600 continues to 615, wherein method 600 maintains operating conditions and does not randomize a zero-sequence voltage. Method 600 then returns.

However, referring again to 610, if PWM is active ("YES"), method 600 continues to 620. At 620, method 600 determines phase voltage commands for the electric machine for the sample period. The phase voltage commands include a target phase voltage for each phase of the electric machine, and therefore method 600 may determine the phase voltage commands based on the torque demand. Method 600 may further determine the phase voltage commands based on one or more of the torque output of the electric machine (e.g., as evaluated at 605 from the motor current signal) and the rotor speed of the electric machine (e.g., as evaluated at 605 from the motor position signal).

Method 600 may generate the phase voltage commands based on one or more of the torque demand, the torque output, and the rotor speed by using one or more functions that output the phase voltage commands given the inputs, wherein the one or more functions may be selected according to a given PWM scheme.

Continuing at 625, method 600 randomly selects a value for the sample period based on a random distribution. For example, method 600 may randomly select a value between 0 and 1, wherein the random values are uniformly distributed between 0 and 1 such that the random distribution comprises a uniform random distribution with an equal probability for each value between 0 and 1. In other examples, the random distribution may be altered to decrease the probability of certain values and increase the probability of other values. Such a random distribution may be altered, for example, to depend on operating points of the vehicle. As one example, the random distribution may comprise a Bernoulli distribution. The use of a Bernoulli distribution for the random distribution may result in the random selection of an upper or lower boundary of a potential zero-sequence, which corresponds to discontinuous PWM (DPWM) wherein the zero-sequence is chosen such that one of the phases does not switch during a given switching period. In this way, the switching-loss reduction of DPWM may be combined with the reduction in NVH from a randomized zero-sequence.

After randomly selecting a value for the sample period based on the random distribution, method 600 continues to 630. At 630, method 600 determines a potential range for the zero-sequence voltage based on the phase voltage commands. For example, for the set of phase voltage commands $\overline{V_{abc}[T]}$, where T is the sample instant for the present sample period (e.g., the sampling instant wherein operating conditions are evaluated for controlling the vehicle during the sample period immediately following the sample instant), method 600 calculates the minimum zero-sequence minZS[T] at the sample instant T according to:

$$\text{minZS}[T] = -1 - \min(\overline{V_{abc}[T]}),$$

and the maximum zero-sequence maxZS[T] at the sample instant T according to:

$$\text{maxZS}[T] = 1 - \max(\overline{V_{abc}[T]}).$$

The minimum and maximum zero-sequences thus form the boundaries of the potential range of zero-sequence voltages. It should be appreciated that the equations above may be adapted such that the minimum and maximum zero-sequences are determined relative to the DC bus voltage $V_{DC}$ at sample instant T.

Continuing at 635, method 600 calculates a zero-sequence voltage based on the randomly-selected value and the potential range for the zero-sequence voltage. For example, for the randomly-selected value R, the minimum zero-sequence minZS[T] and the maximum zero-sequence maxZS[T], method 600 calculates the zero-sequence voltage ZS[T] according to:

$$ZS[T] = \text{minZS}[T] + R \cdot (\text{maxZS}[T] - \text{minZS}[T]).$$

In this way, due to the randomly-selected value R, the zero-sequence voltage ZS[T] thus comprises a randomized value within the potential range of zero-sequence voltages bound by the minimum and maximum zero-sequence voltages for the sample period.

At 640, method 600 adjusts the phase voltage commands with the zero-sequence voltage. For example, method 600 adds the randomized zero-sequence voltage ZS[T] to the phase voltage commands:

$$\overline{V'_{abc}[T]} = \overline{V_{abc}[T]} + ZS[T],$$

where $V'_{abc}[T]$ comprises the adjusted phase voltage commands.

At 645, method 600 determines PWM duty-cycle signals based on the adjusted phase voltage commands. For example, method 600 calculates the PWM duty-cycle signals to drive PWM for the upper switches and lower switches of the inverter 118 such that the inverter 118 converts the DC bus voltage $V_{DC}$ input to the inverter 118 into AC power, in particular the individual phase voltage signals corresponding to the adjusted phase voltage commands, which are then provided to the respective windings 123, 124, and 125 of the motor 113. At 650, method 600 controls the inverter, such as the inverter 118, with the PWM duty-cycle signals. Method 600 then returns.

Thus, method 600 randomizes a zero-sequence component of the phase voltage command for a single sample period of PWM. Method 600 may be executed during each sample period such that the zero-sequence component is randomized through PWM control over time.

As an illustrative example, FIG. 7 shows a set of graphs 700 illustrating example phase voltage commands for different zero-sequence schemes over time. In particular, graph 710 shows phase voltage commands for a first phase voltage $V_a$ for a first phase A of a three-phase electric machine such as the motor 113, graph 720 shows phase voltage commands for a second phase voltage $V_b$ for a second phase B of the three-phase electric machine, and graph 730 shows phase voltage commands for a third phase voltage $V_c$ for a third phase C of the three-phase electric machine. The different zero-sequence schemes include a sine-triangle modulation (STM) scheme wherein there is no zero-sequence voltage; a center-based space vector modulation (CSVM) scheme wherein the zero-sequence voltage is alternated to ensure the pulses stay centered within the switching window or PWM period; a discontinuous PWM (DPWM) scheme wherein the zero-sequence voltage is selected such that one of the resulting phase voltages is always at the maximum or the minimum, resulting in one of the resulting phases not switching during a given switching period; and a randomized zero-sequence (RZS) scheme, wherein the zero-sequence voltage is randomized as described herein for each sample period with a uniform random distribution.

For the STM scheme, graph 710 depicts an STM phase voltage 712, graph 720 depicts an STM phase voltage 722, and graph 730 depicts an STM phase voltage 732. The STM phase voltages 712, 722, and 732 for the three phases A, B, and C respectively comprise simple sinusoids operating within the voltage limitations of the DC bus voltage.

For the CSVM scheme, graph 710 depicts a CSVM phase voltage 714, graph 720 depicts a CSVM phase voltage 724, and graph 730 depicts a CSVM phase voltage 734. The CSVM phase voltages 714, 724, and 734 include zero-sequence voltages that center the active voltage period within each switching period.

For the DPWM scheme, graph 710 depicts a DPWM phase voltage 716, graph 720 depicts a DPWM phase voltage 726, and graph 730 depicts a DPWM phase voltage 736. The DPWM phase voltages 716, 726, and 736 include zero-sequence voltages selected to ensure that one phase is clamped to either the maximum or minimum available voltage.

For the RZS scheme, graph 710 depicts an RZS phase voltage 718, graph 720 depicts an RZS phase voltage 728, and graph 730 depicts an RZS phase voltage 738. The randomization of the zero-sequence voltage, along with the randomization of the PWM switching frequency, results in significant increases in phase voltage, up to the limit of the inverter during some sample periods. However, randomly modifying the zero-sequence voltage and thus randomly modifying the phase voltages in this way does not alter the current fundamental of the electric machine or motor, and therefore does not impact torque production. In this way, randomizing the zero-sequence voltage disrupts the switching pattern without disrupting the torque production of an electrified drivetrain.

FIG. 8 shows a graph 800 illustrating the example zero-sequence voltages for the example phase voltage commands of FIG. 7. In particular, graph 800 depicts the zero-sequence voltage 802 for the STM scheme, the zero-sequence voltage 8 for the CSVM scheme, the zero-sequence voltage 806 for the DPWM scheme, and the zero-sequence voltage 808 for the RZS scheme. As described hereinabove, the zero-sequence voltage 802 for the STM scheme is constantly zero over time, as there is no zero-sequence voltage for STM. The zero-sequence voltage 804 for the CSVM scheme alternates to ensure the pulses stay centered within the switching window, as described hereinabove. The zero-sequence voltage 806 for the DPWM scheme alternates over time such that one of the resulting phase voltages is at the maximum or minimum possible voltage at any given time. The zero-sequence voltage 808 for the RZS scheme, in contrast with the other zero-sequence voltages 802, 804, and 806, randomly varies between sample periods as depicted. It should be appreciated that when the zero-sequence voltages 802, 804, 806, and 808 are deducted from the respective phase voltages of FIG. 7, the resulting phase voltages are identical to the STM phase voltages 712, 722, and 732.

To illustrate the impact of the randomized zero-sequence on the PWM duty-cycle signals for controlling the inverter, FIG. 9 shows a graph 900 illustrating example PWM duty-cycle commands for the different zero-sequence schemes discussed hereinabove. In particular, the graph 900 includes a duty-cycle command 910 for the STM scheme, a duty-cycle command 920 for the CSVM scheme, a duty-cycle command 930 for the DPWM scheme, and duty-cycle command 940 for the RZS scheme, wherein the duty-cycle commands are depicted relative to a same PWM carrier signal 950 and wherein the vertical dashed lines of graph 900 delineate the PWM periods.

As depicted, the pulse width for each active pulse within each PWM period is the same regardless of the zero sequence. Rather than changing the pulse width, adjusting the zero sequence instead adjusts the position active pulse within each PWM period. Thus, STM duty-cycle command 910 is wholly defined by the underlying voltage command. As depicted by the CSVM duty-cycle command 920, the active pulses are centered within each PWM period. The DPWM duty-cycle command 930 illustrates that adjacent pulses are combined into a single pulse, thus eliminating some of the switching events and reducing switching loss. The RZS duty-cycle command 940 illustrates that the active pulse is randomly located within the PWM period.

FIG. 10 shows a graph 1000 illustrating an example power spectral density (PSD) 1005 of inverter voltage $V_{dq}$ during adaptation of PWM with center-based space vector modulation (CSVM) and an example power spectral density 1010 of inverter voltage $V_{dq}$ during adaptation of PWM with zero-sequence randomization or RZS. As discussed hereinabove, CSVM includes setting the zero-sequence voltage to the midpoint between the maximum and minimum zero-sequence voltages at a sample instant, for example such that R is 0.5, whereas RZS includes randomly selecting a value for R from the set (0, 1) according to a random distribution. For the purposes of this example, a uniform random distribution is used as the random distribution for RZS. Furthermore, for both the CSVM and RZS PWM schemes, random PWM is used such that the PWM switching frequencies are randomly varied.

The peak magnitudes of the PWM-related content, such as the peaks in the CSVM power spectral density 1005 at the frequencies ±8 kHz, are reduced by randomizing the zero-sequence voltage as described herein, as depicted by the corresponding peak magnitudes of the RZS power spectral density 1010. Thus, the RZS PWM scheme achieves improved spectral dispersion relative to CSVM PWM as depicted, and especially relative to STM and DPWM PWM schemes.

The technical effect of the present disclosure includes the reduction of acoustic emissions from an electrified powertrain during pulse width modulated control of the electrified powertrain. Another technical effect of the present disclosure includes the randomization of a common-mode voltage or zero-sequence voltage for a three-phase wye-connected electric machine of an electrified powertrain of a vehicle. Yet another technical effect of the present disclosure includes the increased spectral energy dispersion in pulse-width modulated control of an electrified powertrain. Another technical effect of the present disclosure includes the randomly-adjusted position of voltage pulses within PWM switching periods.

As one embodiment, a method for a vehicle comprises determining a zero-sequence voltage of an electric machine of the vehicle based on a random distribution, the random distribution scaled based on a potential range of the zero-sequence voltage, and adjusting a voltage reference signal of the electric machine based on the determined zero-sequence voltage to decrease ambient acoustic noise in the vehicle.

In a first example of the method, the method further comprises determining a switching frequency of a pulse-width modulated voltage of the electric machine based on a second random distribution. In a second example of the method optionally including the first example, the random distribution comprises a uniform random distribution. In a third example of the method optionally including one or more of the first and second examples, the method further comprises selecting a random distribution based on one or more operating conditions of the vehicle, wherein the random distribution comprises the selected random distribution. In a fourth example of the method optionally including one or more of the first through third examples, the method further comprises determining target voltage commands for the electric machine according to a torque demand, and determining the potential range of the zero-sequence voltage for the target voltage commands for the electric machine. In a fifth example of the method optionally including one or more of the first through fourth examples, the method further comprises determining the potential range of the zero-sequence voltage for the target voltage commands for the electric machine relative to voltage limitations of an inverter for the electric machine. In a sixth example of the method optionally including one or more of the first through fifth examples, determining the potential range of the zero-sequence voltage for the target voltage commands for the electric machine relative to the voltage limitations of the inverter for the electric machine comprises determining a minimum zero-sequence voltage and a maximum zero-sequence voltage for the target voltage commands at a sampling instant relative to the voltage limitations of the inverter, wherein the potential range of the zero-sequence voltage extends from the minimum zero-sequence voltage to the maximum zero-sequence voltage. In a seventh example of the method optionally including one or more of the first through sixth examples, determining the zero-sequence voltage based on the random distribution scaled based on the potential range of the zero-sequence voltage comprises randomly selecting the zero-sequence voltage from the potential range of the zero-sequence voltage. In an eighth example of the method optionally including one or more of the first through seventh examples, the method further comprises determining the zero-sequence voltage of the electric machine based on the random distribution for each sampling period of pulse width modulated control of the electric machine. In a ninth example of the method optionally including one or more of the first through eighth examples, the electric machine comprises a three-phase wye-connected electric machine of an electrified powertrain of the vehicle.

In another embodiment, a method comprises, at a sampling instant of pulse width modulated control of an inverter for an electric machine of a vehicle, determining a target voltage command for the electric machine for a sampling period following the sampling instant, randomly selecting a zero-sequence voltage for the target voltage command, adjusting the target voltage command with the randomly-selected zero-sequence voltage, updating the pulse width modulated control of the inverter for the electric machine according to the adjusted target voltage command, and driving the inverter with the updated pulse width modulated control during the sampling period.

In a first example of the method, the method further comprises measuring a torque output of the electric machine and a rotor speed of the electric machine at a sampling instant for the sampling period, receiving a torque demand for the electric machine at a sampling instant for the sampling period, and determining the target voltage command for the electric machine for the sampling period based on the measured torque output, the measured rotor speed, and the received torque demand. In a second example of the method optionally including the first example, the method further comprises randomizing a switching frequency of the pulse width modulated control of the inverter. In a third example of the method optionally including one or more of the first and second examples, randomly selecting the zero-sequence voltage for the target voltage command comprises determining a potential range of zero-sequence voltages for the target voltage command, and randomly selecting the zero-sequence voltage from the potential range of zero-sequence voltages for the target voltage command according to a random distribution. In a fourth example of the method optionally including one or more of the first through third examples, the random distribution comprises one of a uniform random distribution or a Bernoulli distribution configured with probabilities corresponding to selected operating points of the electric machine.

In yet another embodiment, a system for a vehicle comprises a plurality of drive wheels, an electric motor configured to deliver torque to the plurality of drive wheels, a battery configured to provide power to the electric motor, and a controller configured to: randomly select a zero-sequence voltage for the electric motor; and adjust a voltage reference signal for the electric machine based on the randomly-selected zero-sequence voltage to decrease ambient acoustic noise in the vehicle.

In a first example of the system, the system further comprises an inverter configured to transfer the power from the battery to the electric motor responsive to pulse width modulated (PWM) signals, and the controller further configured to: update the PWM signals according to the adjusted voltage reference signal; and drive the inverter with the updated PWM signals. In a second example of the system optionally including the first example, the controller further configured to randomly select switching frequencies for the PWM signals. In a third example of the system optionally including one or more of the first and second examples, the controller is further configured to: determine target voltage commands for the electric motor according to a torque demand; determine a potential range of zero-sequence voltages for the target voltage commands for the electric motor; and randomly select the zero-sequence voltage from the potential range of zero-sequence voltages. In a fourth example of the system optionally including one or more of the first through third examples, the controller is further configured to: randomly select the zero-sequence voltage from the potential range of zero-sequence voltages based on a random distribution, the random distribution comprising one of a uniform random distribution or a Bernoulli distribution configured with probabilities corresponding to operating points of the electric motor.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations, and/or functions may be repeatedly performed depending on the particular strategy being used. Further, the described actions, operations, and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. Moreover, unless explicitly stated to the contrary, the terms "first," "second," "third," and the like are not intended to denote any order, position, quantity, or importance, but rather are used merely as labels to distinguish one element from another. The subject matter of the present disclosure includes all novel and non-obvious combinations and sub-combinations of the various systems and configurations, and other features, functions, and/or properties disclosed herein.

As used herein, the term "approximately" is construed to mean plus or minus five percent of the range unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for a vehicle, the method comprising:
adjusting a zero-sequence voltage of an electric machine of the vehicle based on a random distribution, the random distribution scaled based on a potential range of the zero-sequence voltage; and
adjusting a voltage reference signal of the electric machine based on the adjusted zero-sequence voltage to decrease ambient acoustic noise in the vehicle.

2. The method of claim 1, further comprising determining a switching frequency of a pulse-width modulated voltage of the electric machine based on a second random distribution.

3. The method of claim 1, wherein the random distribution comprises a uniform random distribution.

4. The method of claim 1, further comprising selecting a random distribution based on one or more operating conditions of the vehicle, wherein the random distribution comprises the selected random distribution.

5. The method of claim 1, further comprising determining target voltage commands for the electric machine according to a torque demand, and determining the potential range of the zero-sequence voltage for the target voltage commands for the electric machine.

6. The method of claim 5, further comprising determining the potential range of the zero-sequence voltage for the target voltage commands for the electric machine relative to voltage limitations of an inverter for the electric machine.

7. The method of claim 6, wherein determining the potential range of the zero-sequence voltage for the target voltage commands for the electric machine relative to the voltage limitations of the inverter for the electric machine comprises determining a minimum zero-sequence voltage and a maximum zero-sequence voltage for the target voltage commands at a sampling instant relative to the voltage limitations of the inverter, wherein the potential range of the zero-sequence voltage extends from the minimum zero-sequence voltage to the maximum zero-sequence voltage.

8. The method of claim 7, wherein determining the zero-sequence voltage based on the random distribution scaled based on the potential range of the zero-sequence voltage comprises randomly selecting the zero-sequence voltage from the potential range of the zero-sequence voltage.

9. The method of claim 1, further comprising determining the zero-sequence voltage of the electric machine based on the random distribution for each sampling period of pulse width modulated control of the electric machine.

10. The method of claim 1, wherein the electric machine comprises a three-phase wye-connected electric machine of an electrified powertrain of the vehicle.

11. A method, comprising:
at a sampling instant of pulse width modulated control of an inverter for an electric machine of a vehicle, determining a target voltage command for the electric machine for a sampling period following the sampling instant;
randomly selecting a zero-sequence voltage for the target voltage command;
adjusting the target voltage command with the randomly-selected zero-sequence voltage;
updating the pulse width modulated control of the inverter for the electric machine according to the adjusted target voltage command; and
driving the inverter with the updated pulse width modulated control during the sampling period.

12. The method of claim 11, further comprising:
measuring a torque output of the electric machine and a rotor speed of the electric machine at a sampling instant for the sampling period;
receiving a torque demand for the electric machine at a sampling instant for the sampling period; and
determining the target voltage command for the electric machine for the sampling period based on the measured torque output, the measured rotor speed, and the received torque demand.

13. The method of claim 12, further comprising randomizing a switching frequency of the pulse width modulated control of the inverter.

14. The method of claim 12, wherein randomly selecting the zero-sequence voltage for the target voltage command comprises:
determining a potential range of zero-sequence voltages for the target voltage command; and
randomly selecting the zero-sequence voltage from the potential range of zero-sequence voltages for the target voltage command according to a random distribution.

15. The method of claim 14, wherein the random distribution comprises one of a uniform random distribution or a Bernoulli distribution configured with probabilities corresponding to selected operating points of the electric machine.

16. A system for a vehicle, comprising:
a plurality of drive wheels;
an electric motor configured to deliver torque to the plurality of drive wheels;
a battery configured to provide power to the electric motor; and
a controller configured to:
randomly select a zero-sequence voltage for the electric motor; and
adjust a voltage reference signal for the electric machine based on the randomly-selected zero-sequence voltage to decrease ambient acoustic noise in the vehicle.

17. The system of claim 16, further comprising an inverter configured to transfer the power from the battery to the electric motor responsive to pulse width modulated (PWM) signals, the controller further configured to:
update the PWM signals according to the adjusted voltage reference signal; and
drive the inverter with the updated PWM signals.

18. The system of claim 17, wherein the controller further stores instructions that when executed cause the controller to randomly select switching frequencies for the PWM signals.

19. The system of claim 16, wherein the controller is further configured to:
determine target voltage commands for the electric motor according to a torque demand;
determine a potential range of zero-sequence voltages for the target voltage commands for the electric motor; and randomly select the zero-sequence voltage from the potential range of zero-sequence voltages.

20. The system of claim 19, wherein the controller is further configured to:

randomly select the zero-sequence voltage from the potential range of zero-sequence voltages based on a random distribution, the random distribution comprising one of a uniform random distribution or a Bernoulli distribution configured with probabilities corresponding to operating points of the electric motor.

* * * * *